US007019760B2

(12) United States Patent
Harrington

(10) Patent No.: US 7,019,760 B2
(45) Date of Patent: Mar. 28, 2006

(54) METHOD AND APPARATUS FOR FAST COMPUTATION OF ASSOCIATIVE OPERATIONS OVER FIXED SIZE REGIONS OF A DIGITAL IMAGE

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 277 days.

(21) Appl. No.: 10/039,299

(22) Filed: Jan. 2, 2002

(65) Prior Publication Data

US 2003/0122848 A1    Jul. 3, 2003

(51) Int. Cl.
G09G 5/00    (2006.01)
(52) U.S. Cl. .............. 345/619; 345/600; 345/601; 345/606; 345/690
(58) Field of Classification Search .......... 345/600, 345/601, 606, 619, 690, 698
See application file for complete search history.

(56) References Cited

U.S. PATENT DOCUMENTS

| 5,086,496 | A | * | 2/1992 | Mulmuley | 345/421 |
| 5,856,829 | A | * | 1/1999 | Gray et al. | 345/422 |
| 5,900,860 | A | * | 5/1999 | Ueda | 345/600 |
| 5,940,080 | A | * | 8/1999 | Ruehle et al. | 345/611 |
| 6,232,981 | B1 | * | 5/2001 | Gossett | 345/582 |
| 6,448,968 | B1 | | 9/2002 | Pfister et al. | 345/423 |
| 6,498,607 | B1 | * | 12/2002 | Pfister et al. | 345/423 |
| 6,646,647 | B1 | * | 11/2003 | Surgutchik et al. | 345/581 |
| 6,714,694 | B1 | | 3/2004 | Marshall | |
| 6,909,913 | B1 | * | 6/2005 | Vining | 600/407 |
| 2001/0033287 | A1 | * | 10/2001 | Naegle et al. | 345/601 |
| 2003/0123749 | A1 | | 7/2003 | Cheng et al. | |

* cited by examiner

Primary Examiner—Matthew C. Bella
Assistant Examiner—Mike Rahmjoo
(74) Attorney, Agent, or Firm—Fay, Sharpe, Fagan, Minnich & McKee, LLP

(57) ABSTRACT

This invention relates to a method and apparatus for fast computation of associative operations over fixed size regions of a digital image. More particularly, this invention relates to the application of associative operations—such as MINIMUM, MAXIMUM, AND and OR—to fixed size regions of a digital image such as hexagonal, octagonal and rectangular regions. This is accomplished by tiling the image and calculating two-dimensional running calculations of the operator for each possible corner overlap configuration of a window that is run over the tiles of the image and thus used to analyze the image. Combining the appropriate running calculations for a particular window position yields the final result for that position

17 Claims, 6 Drawing Sheets

METHOD AND APPARATUS FOR FAST COMPUTATION OF ASSOCIATIVE OPERATIONS OVER FIXED SIZE REGIONS OF A DIGITAL IMAGE

BACKGROUND OF THE INVENTION

This invention relates to a method and apparatus for fast computation of associative operations over fixed size regions of a digital image. More particularly, this invention relates to the application of associative operations—such as MINIMUM, MAXIMUM, AND and OR—to fixed size regions of a digital image such as hexagonal, octagonal and rectangular regions. This is accomplished by tiling the image and calculating two-dimensional running calculations of the operator for each possible corner overlap configuration of a window that is run over the tiles of the image and thus used to analyze the image. Combining the appropriate running calculations for a particular window position yields the final result for that position While the invention is particularly directed to the art of digital imaging, and will be thus described with specific reference thereto, it will be appreciated that the invention may have usefulness in other fields and applications. For example, the principles of the invention may be implemented in any field where the determination of associative properties across an array of values is useful.

By way of background, a commonly assigned, co-pending patent application, which issued as U.S. Pat. No. 6,714,694 B1 to Marshall entitled "A Method for Sliding Window Image Processing of Associative Operators"—which is incorporated herein by this reference—describes a method for fast computation of associative operators for a fixed size window in one dimension. As disclosed therein, by repeating the process, it may be extended to application to a rectangular window in two dimensions. However, the rectangular shape is usually not ideal for image processing operations. Regions that more closely resemble circles yield better results.

More particularly, the '726 application first considers the problem of applying an operation to a moving segment along a scan line in one dimension and then discloses that the process may be applied to two dimensions. In this regard, the '726 application considers, for a sliding window of size n, the data is first divided into (n+1)-element blocks. Then, for each element in the block starting from the left end of the block the operation is successively applied to the previous result and the next element of the block. Similarly, from the right end of the block the operation is successively applied to the previous result and the next element of the block. At this point, it should be understood that one does not need to calculate the operation across the entire block as this would be across n+1 elements and the sliding window contains only n elements. The next step of the method involves the step of for each position of the sliding window determining which block or blocks lie under the sliding window and, if this is a single block, retrieving the value calculated for the elements of the sliding window, or if there are two blocks, combining the previously calculated values in each block corresponding to the part of the sliding window contained in the block. It takes n−1 operations to calculate the left-end results in each block, n−1 operations to calculate the right-end results in each block, and n−1 operations to calculate the n−1 possible overlap positions thereby generating a total of 3*n−3 operations to calculate n+1 windowed results Note that two of the sliding window positions do not overlap two blocks and no further calculation is necessary in these cases. This averages to less than 3 operations per calculated value.

For example, to calculate a MIN function in a sliding window of length n, an appropriate block size is n+1 because a window of size n always contains an edge of every block it intersects. Then, in each block, calculate and remember successive cumulative minimums from the left edge and then from the right edge Now, for any position of the sliding window, the minimum in the sliding window can be calculated with at most one more MIN operation. If the sliding window is completely contained in a single block then either the left edge of the sliding window coincides with the left edge of the containing block or the right edge of the sliding window coincides with the right edge of the containing block and the minimum has already been calculated. If the sliding window overlaps two blocks then the minimum in the sliding window can be calculated by taking the minimum of the part of the left block overlapped by the sliding window and the part of the right block overlapped by the sliding window and both of these values have been previously calculated. The total number of operations for this example is (n−1 operations per block for calculations from the left end of the block)+(n−1 operations per block for calculations from the right end of the block)+(n−1 operations to combine results for cases where the sliding window straddles two blocks)+(0 operations in the two cases when the sliding window is contained within a single block)=3n−3 operations to handle n+1 positions of the sliding window or (3n−3)M/(n+1) or about 3M, where M is the scan length, as compared to (n−1)M using prior art, where n is the length of the sliding window As an example, consider the data identified by ABCDEFGHIJK with a sliding window length of 4. If we block by 4+1=5 with a sliding window length of 4 then the calculation proceeds as follows:

| ABCDE|FGHIJ|KLMNO|... (blocking of the data by 5) | |
|---|---|
| AB = op(A,B) | operating from left end of block 1 |
| ABC = op(AB,C) | |
| ABCD = op(ABC,D) | |
| DE = op(D,E) | operating from the right end of block 1 |
| CDE = op(C,DE) | |
| BCDE = op(B,CDE) | |
| FG = op(F,G) | operating from the left end of block 2 |
| FGH = op(FG,H) | |
| FGHI = op(FGH,I) | |
| IJ = op(I,J) | operating from the right end of block 2 |
| HIJ + op(H,IJ) | |
| GHIJ = op(G,HIJ) | |
| KL = op(K,L) | operating from the left end of block 3 |
| KLM = op(KL,M) | |
| KLMN = op(KLM,N) | | etc. and now calculate the sliding window values as
ABCD—already calculated above
BCDE—already calculated above
op(CDE,F)
op(DE,FG)
op(E,FGH)
FGHI—already calculated above
GHIJ—already calculated above
op(HIJ,K)
op(IJ,KL)
op(J,KLM)
KLMN—already calculated
LMNO—already calculated etc.

Two-dimensional rectangular windows can be calculated by first using the method along rows and storing these results in a two-dimensional array then taking these results and applying the method to columns of this array.

Thus, the approach disclosed in the '726 application for conducting the above described operation for a two-dimensional rectangular box is to calculate the one-dimensional operation for each row of the window and then use the same approach for the columns of row results. However, an alternative method for generalizing such a process to two dimensions is desired. It is also desirable to be able to adapt such an alternative process to be applicable to octagonal and hexagonal window shapes, which are more conducive to image analysis The present invention contemplates a new and improved method and apparatus for fast computation of associative operations over fixed size regions that resolves the above-referenced difficulties and others.

SUMMARY OF THE INVENTION

A method and apparatus for fast computation of associative operations over fixed size regions of a digital image are provided.

In one aspect of the invention, the method comprising steps of scanning the array to determine the pixel values, segmenting the array into blocks of the pixel values, performing an associative operation on the pixel values of each block to determine properties of the each block, storing the properties of the each block in a table, providing a window defining a fixed size region of the image, the window having vertices and being configured such that a single vertex at most will be encompassed by any given block having portions within the fixed size region, determining which portions of which blocks are within the fixed size region, selecting a property for each portion of each block within the fixed size region from the table based on the determining of which portions of which blocks are within the fixed size region and locations of the vertices of the window and performing the operation on the selected properties to determine an overall property for the fixed size region.

In another aspect of the invention, performing the associative operation comprises determining maximum pixel values.

In another aspect of the invention, performing the associative operation comprises determining minimum values.

In another aspect of the invention, the performing of the operation on the selected properties comprises performing an operation to determine a maximum value In another aspect of the invention, the performing of the operation on the selected properties comprises performing an operation to determine a minimum value In another aspect of the invention, providing a window defining a fixed size region of the image comprises providing a window having a rectangular shape.

In another aspect of the invention, providing a window defining a fixed size region of the image comprises providing a window of octagonal shape In another aspect of the invention, providing a window defining a fixed size region of the image comprises providing a window of hexagonal shape.

In another aspect of the invention, an apparatus is provided to implement the method according to the present invention.

In another aspect of the invention, the method comprises steps of dividing a complex window into regions, computing a property for each region to obtain a partial result by conducting an associative operation, and determining the property for the complex window based on partial results of the regions by conducting the associative operation on the partial results Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
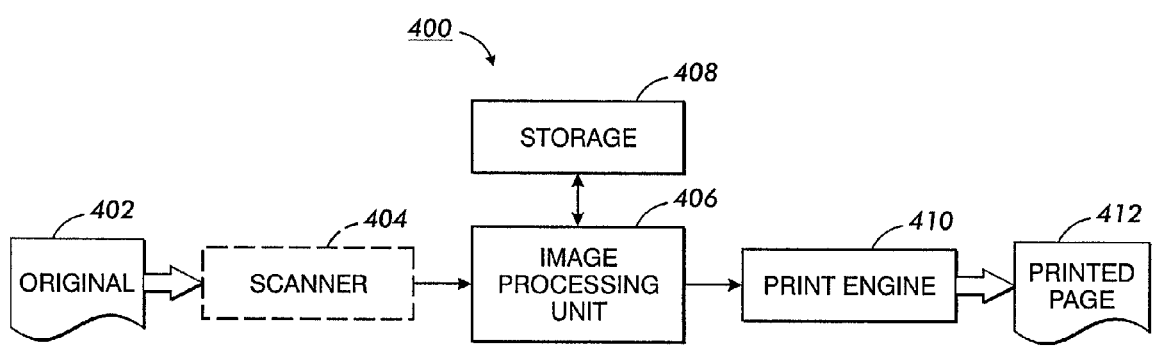
FIG. 1 is an illustration of an example of an overall system into which the present invention is incorporated.

Referring now to the drawings wherein the showings are for purposes of illustrating the preferred embodiments of the invention only and not for purposes of limiting same, FIG. 1 provides a view of an example of an overall system into which the method and apparatus according to the present invention are incorporated. As shown, a system 400 is configured to accept an original document or image 402 that is scanned by scanner 404 (or digital camera or other image capture device) and converted to a digital image. The digital image is then fed to image processing unit 406. The processing unit 406 is operatively associated with a storage module 408 The image processing unit 406 is also connected to print engine 410 which outputs a printed page 412 (or sends a processed image to another image receiving device such as an image repository).

It should be appreciated that the system 400 may be a copier or other image rendering device, such as a facsimile machine, that has the ability to accept a hardcopy of a document and convert the document to a digital image.

However, the invention may also be applied to a suitable printer In that case, the scanner 404 would not be necessary and the original document, which would typically be a digital image fed from a word processor (or digital camera or other image capture device), would be directly input to the image processing unit 406.

Preferably, the image processing unit 406 includes necessary software and hardware to accommodate the method and apparatus of the present invention. The image processing unit 406 may thus take a variety of forms that will be apparent to those of skill in the art upon a reading and understanding of the present invention. For example, for a pure software implementation, a conventional processor may suffice. However, if constraints such as certain performance standards require a hardware implementation, specialized ASICs or other hardware components may be used as a part of or in conjunction with the imaging processing unit 406. Also, the unit 406 preferably makes use of the storage device 408.

The storage device 408 may likewise take a variety of forms depending on the precise implementation of the present invention Preferably, however, the storage unit 408 includes a read/write capability and is able to accommodate data stored in look up table format. The storage unit 408 is also preferably configured to store the code necessary to implement the present invention, such code being accessible by the image processing unit 406. As such, the storage unit 408 may include a variety of ROM and RAM modules.

The print engine 410 could be a xerographic print engine. However, any suitable print engine may be used.

The present invention is directed to a technique for conducting an associative operation on values of pixels of an image that are contained within a fixed size region. The present invention may be generally applied to any fixed size image region and will be described as such in connection with FIG. 2. However, preferred such regions and the implementation of the present invention in view thereof will be described in greater detail in connection with FIGS. 3–11. It should be noted, however, that a common feature of the different embodiments resides in the fact that only a single vertice, or corner, of the analysis window—at most—is positioned within a block or tile of an image under analysis. In this way, the corner or vertice can be used to determine the property, or result of an operation, for the portion of the block that is encompassed by the window.

Figure 2:
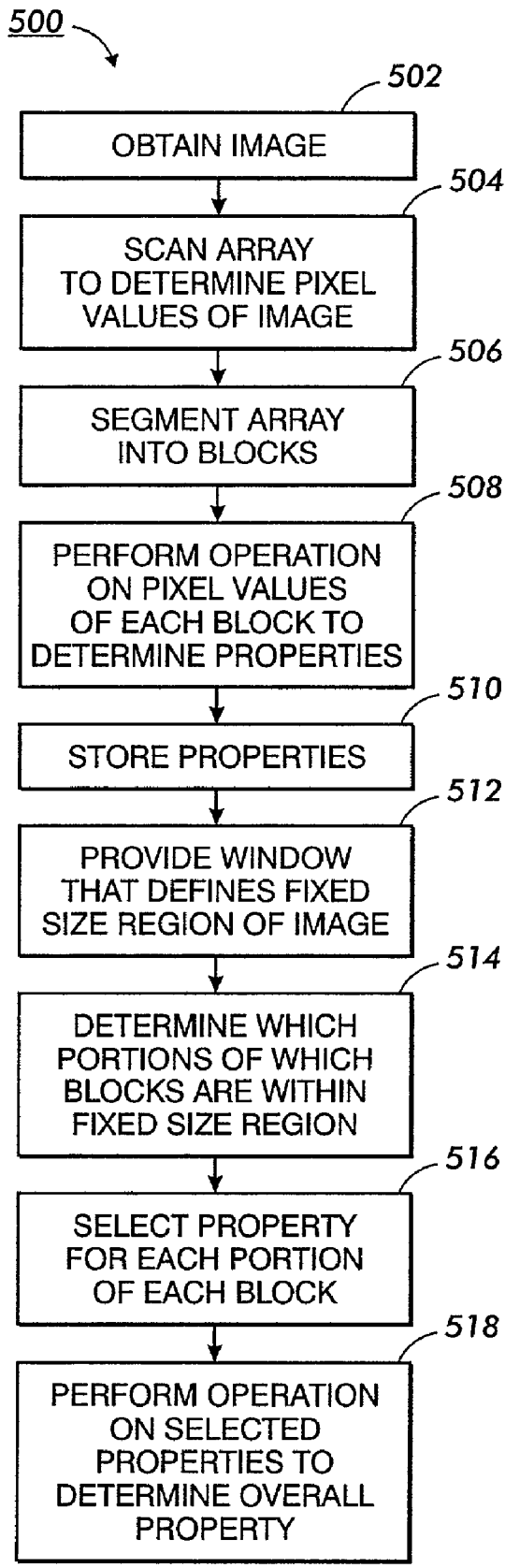
FIG. 2 is a flowchart illustrating the steps of the method according to the present invention.
Figure 4:
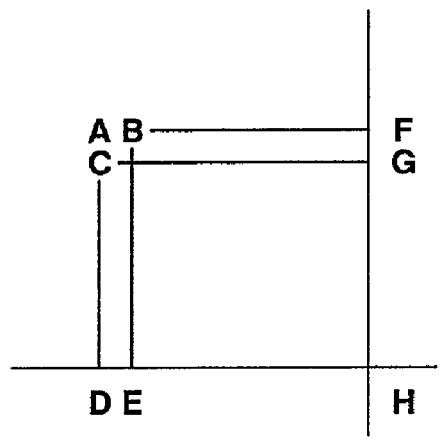
FIG. 4 is an illustration of a recursive calculation of area values

Referring now to FIG. 2, a method 500 is illustrated. It should be recognized that the method 500 may be implemented using a variety of hardware and software techniques. Preferably, any code embodying the method of FIG. 4 is stored in ROM models of storage unit 408 and is accessed by the image processing unit 406 on a selective basis. Moreover, the storage of tables or calculations is preferably accomplished in the RAM models of storage unit 408

The initial steps of the method 500 includes obtaining an image and suitably storing an image in an array (step 502) and scanning the image array to determine the pixel values (step 504). Techniques for performing such scanning are well known in the art. The array is then segmented (or tiled) into blocks (or tiles) of the pixel values (step 506). The size of the blocks should be selected to be constant for the image and preferably is related to the size of the analysis window according to predetermined criteria. For example, the window size may be the same as the block or tile size. A desired associative operation is then performed on the pixel values of each block to determine the properties of each block (step 508). These associative operations (op) have an associative quality in that (x op y) op z=x op (y op z), and they can include MAXIMUM, MINUMUM, AND and OR. The sequential application of these operations depends on the shape and size of the selected window, as will be apparent from the description below.

It should be appreciated that these properties will preferably represent a running calculation as the operation is conducted through the region of the block As such, if only a portion of the block is ultimately encompassed by a single window, the result of the operation for that particular portion of the block is known. For example, in the case where only the lower right quadrant of an image block is encompassed by a rectangular window in a MAXIMUM operation, the maximum pixel value for the lower right quadrant of that block is determined as a property as a result of the recursive operation performed. It should be further appreciated that the determination of properties may require multiple passes through the block of the image. For example, it may well be that the running determination of the properties is accomplished four times, each iteration starting at a different corner of the block of the image. In any event, the properties, or calculation results, of each block are stored in a table (step 510).

A window defining a fixed size region of the image is then provided (step 512) to conduct the preferred operation and/or analysis, the window having vertices and being configured such that a single vertice at most will be encompassed by any given block having portions within the fixed size region. Those skilled in the art will appreciate that the use of windows to conduct analyses or operations on images is well known. However, the provision of windows as described herein and the efficient use thereof was not heretofore known. Next, it is determined which portions of which blocks are within the window, or the fixed size region (step 514). The appropriate property for each portion of each block within the fixed size region is then selected from the table based on the determining of which portions of which blocks are within the fixed size region and locations of the vertices of the window (step 516). To determine the property of the entire region encompassed by the window, the operation is performed on the selected properties, or results, to determine an overall property (step 518).

Figure 3:
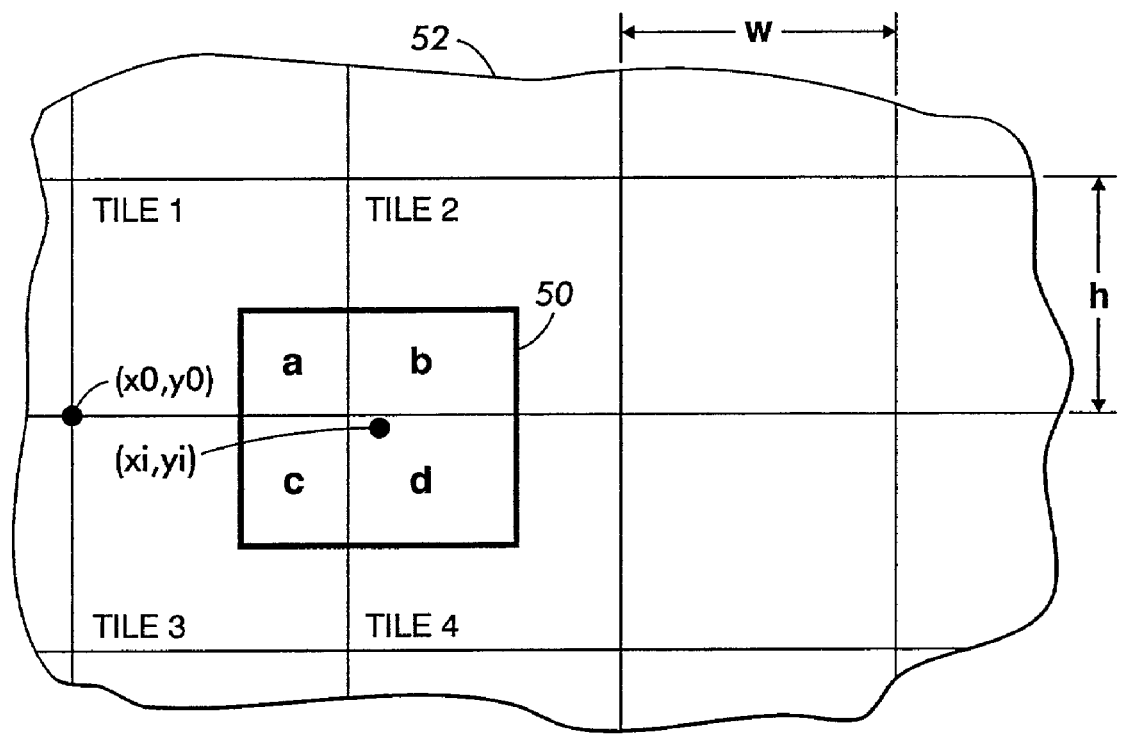
FIG. 3 is an illustration of a window sectioning of four tiles

As noted above, the present invention may be applied to accommodate any window shape defining a fixed size region. Application of the invention to rectangular windows, octagonal windows and hexagonal windows will be described In this regard, referring to FIG. 3, which shows a two-dimensional rectangular window 50, an image portion 52 is tiled or segmented into non-overlapping tiles or blocks (such as in step 506). The size of the tiles or blocks in the example shown is coincident with the rectangular window region. In most circumstances, as the window passes over the image for purposes of analysis, the window will overlap four tiles or blocks. This is depicted in FIG. 3 with the overlap regions labeled a, b, c and d.

Referring now to FIG. 4, an example of determining the properties of a block by performing an associative operation (such as in step 508) is illustrated In this regard, an array of values resulting from applying the desired operation to the pixels is generated by recursively applying the operation to the pixels of each tile which are below and to the right of the value position. Then, the value that is found at the upper left corner of the window is the overall result of the operation on region a. This array of values is constructed by progressing from lower right to upper left and using the pixel value at the position together with previously calculated results As shown, the value for rectangle [A, F, H, D] can be determined by combining the value at A with the values C and B, the values accumulated for rectangles [C, G, H, D] and [B, F, H, E], respectively In this way, the running result for any portion of the block is necessarily determined.

Referring back now to FIG. 3, Q is designated as the operator (e g an associative operator) and w and h as the width and height of the tiles, respectively The pixel values of Tile 1 is labeled as $t1(x=x0, y+y0)$ where the $(x0, y0)$ is in the lower-left corner of Tile 1. The values for the property can be determined by the following expressions

| | |
|---|---|
| $V1(w - 1, 0) = t1(w - 1 + x0, y0)$ | lower right corner |
| $V1(w - 1, y) = Q(t1(w - 1 + x0, y + y0), V1(w - 1, y - 1))$ | right edge |
| $V1(x, 0) = Q(V1(x + 1, 0), t1(x + x0, y0))$ | bottom edge |
| $V1(x, y) = Q(V1(x + 1, y), Q(t1(x + x0, y + y0), V1(x, y - 1)))$ | remaining positions |

The iterative calculation of the properties of Tile 1 using the above equations will result in a determination of properties of the tile starting at the lower right corner and progressing toward the upper left corner. Therefore, the overall value of the property of the block is represented in the array at the upper left corner. In addition, the value of the property of any portion of the block is represented at the upper left corner of that portion. For example, referring to FIG. 4, the value of the property for a portion of an image defined by rectangle [A,F,H,D] is represented at A Similar calculations are defined for the other three tiles. In the illustrated example, however, the distinctions between the calculations for each tile reside in the starting and ending points for the calculations. For example, Tile 2 has a starting point in the lower left corner and an ending point in the upper right corner of the block. Tile 3 has a starting point at the upper right corner and an ending point in the lower left corner Last, Tile 4 has a starting point in the upper left corner and an ending point in the lower right corner. In this way, the calculations can accommodate the window as shown.

For tile 2 the values are determined by

It is to be appreciated that, depending on the position of the window, different running calculations for a particular block or tile may be required For example, if the window of FIG. 3 had its center at $(x0, y0)$, then the appropriate calculations for Tile 1 would have a starting point at the lower left corner and an ending point at the upper right corner, using the equations identified for Tile 2 above As such, the determinations of the properties for the blocks may be carried out entirely before the window is implemented and stored or may be selectively carried out as the analysis progresses. The preference depends on many factors including processing speed and storage space.

Now, to find the value of operator Q on the entire window located with center at $(xi, yi)$, we need to look up the values for regions a, b, c, and d by determining the window corner positions within the respective tile coordinates These region values can be combined with operator Q. The position of the corner is the same for each tile in its own coordinates, namely $(xi-w/2-x0, yi+h/2-y0)$ The result is given by $Q(Q(Q(V1(xi-w/2-x0, yi+h/2-y0), V2(xi-w/2-x0, yi+h/2-y0)),$ $V3(xi-w/2-x0, yi+h/2-y0)), V4(xi-w/2-x0, yi+h/2-y0))$.

In other embodiments of the invention, this approach can be generalized to polygonal shapes other than rectangles. In image processing applications, an operator for a neighborhood of a pixel is often calculated A theoretically ideal neighborhood shape is usually circular; however, circular

| | |
|---|---|
| $V2(0, 0) = t2(x0 + w, y0)$ | lower left corner |
| $V2(0, y) = Q(t2(x0 + w, y + y0), V2(0, y - 1))$ | left edge |
| $V2(x, 0) = Q(t2(x + x0 + w, y0), V2(x - 1, 0))$ | bottom edge |
| $V2(x, y) = Q(V2(x - 1, y), Q(t2(x + x0 + w, y + y0), V2(x, y - 1)))$ | remaining portions |

For tile 3, the values are computed as

| | |
|---|---|
| $V3(w - 1, h - 1) = t3(w - 1 + x0, y0 - 1)$ | upper right corner |
| $V3(x, h - 1) = Q(V3(x + 1, h - 1), t3(x + x0, y0 - 1)$ | top edge |
| $V3(w - 1, y) = Q(t3(w - 1 + x0, y + 1 + y0 - h), V3(w - 1, y))$ | right edge |
| $V3(x, y) = Q(V3(x + 1, y), Q(V3(x, y + 1), t3(x + x0, y + y0 - h)))$ | remaining portions |

Similarly, for the tile 4,

| | |
|---|---|
| $V4(0, h - 1) = t4(x0 + w, y0 - 1)$. | upper left corner |
| $V4(0, y) = Q(t4(x0 + w, y + y0 - h), V4(0, y - 1))$ | left edge |
| $V4(x, h - 1) = Q(t4(x + x0 + w, y0 - 1), V4(x - 1, h - 1))$ | top edge |
| $V4(x, y) = Q(Q(V(x, y + 1), t4(x + x0 + w, y + y0 - h)), V(x - 1, y))$ | remaining portions | regions are difficult shapes with which to deal mathematically and geometrically whereas, as we have just shown, fast methods can be applied to rectangular regions. For this reason, the suboptimal rectangular window is often employed.

However, according to the present invention, polygon shapes such as hexagons and octagons, that more closely resemble the ideal circle than a rectangle, can be used and still allow efficient calculation of associative operators such as MIN or MAX. The key to generalizing the process to other shapes is to divide the image into tiles such that no matter where the current polygonal window lies, there is at most one polygon vertex in a tile, and no tile is divided into more than two contiguous regions by the window.

Figure 5:
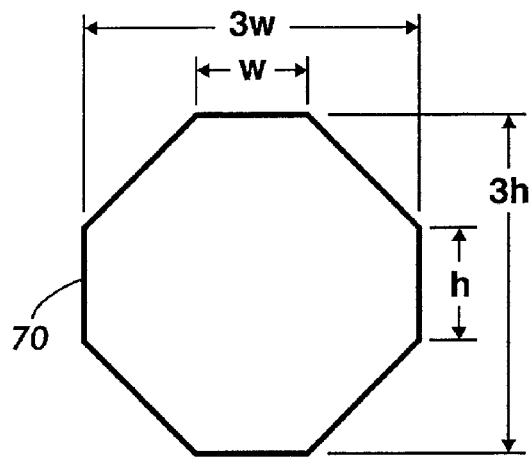
FIG. 5 is an illustration of an octagonal window shape

Referring now to FIG. 5, an octagonal window 70 and its dimensions are shown. As shown, w stands for width and h stands for height of a corresponding block or tile Such a window 70 against a suitable tiling is shown in FIG. 6 An image 80 is tiled or segmented into blocks having a height h and a width w.

Figure 6:
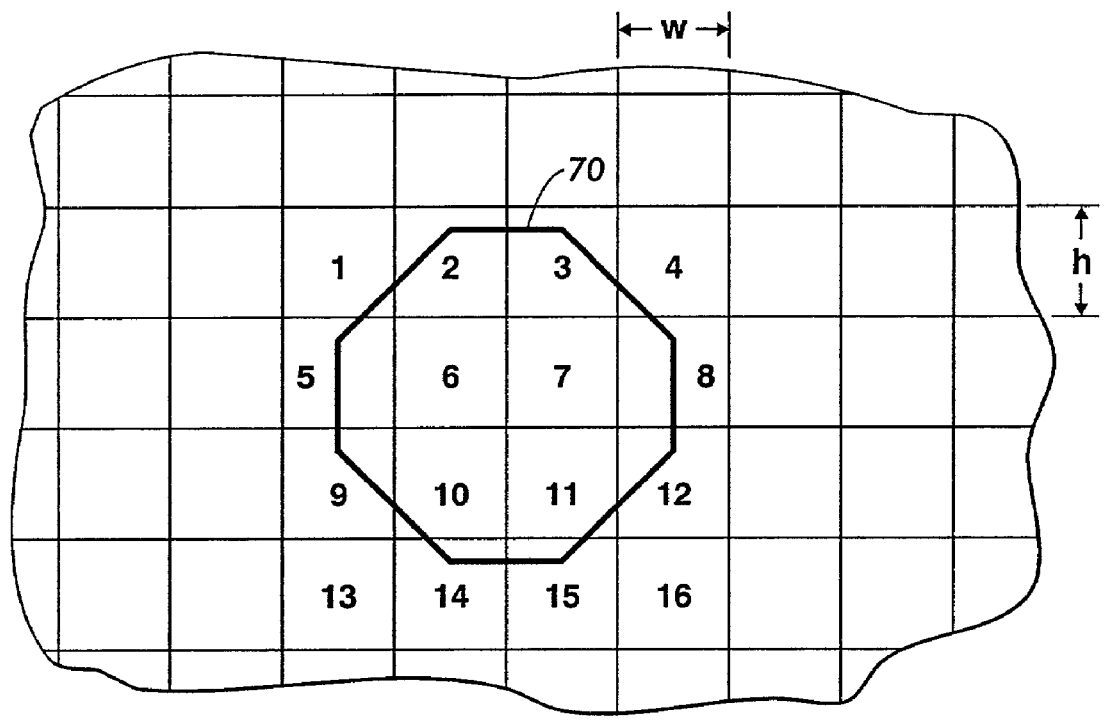
FIG. 6 is an illustration of a tiling for an octagonal window

With this octagon and tiling arrangement of FIG. 6, a tile contains at most one vertex. There are eight vertices and each will require its own table of values for the area of the octagon within the tile corresponding to the vertex. The eight vertices can be found in tiles 2, 3, 5, 8, 9, 12, 14 and 15, as shown in FIG. 6.

Figure 7:
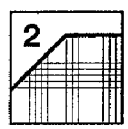
FIG. 7 is an illustration of an octagon area on a tile corresponding to a vertex.
Figure 8:
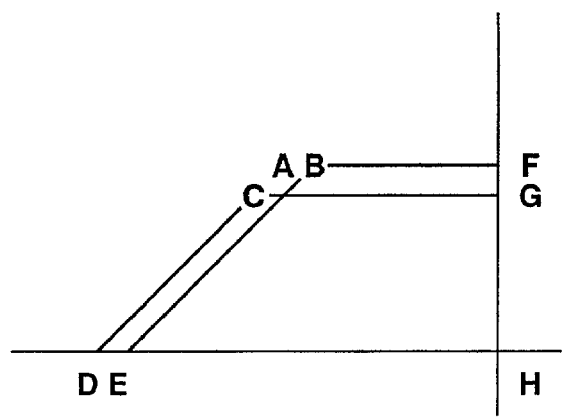
FIG. 8 is an illustration of a recursive evaluation of the operator for an octagon vertex.

FIG. 7 shows the area corresponding to the vertex of tile 2. Referring now to FIG. 8, the operator value for this area shape can be determined for every possible vertex position within the tile in a recursive manner similar to that used in the rectangle case. The operator value for a point can be found by applying the operator to the pixel value at the point and to two previously computed area values As shown, the value for the area [A, F, H, D] can be determined by combining with the operator (Q) the value of the pixel A and the values for areas [C, G, H, D] and [B, F, H, E]. The table of values for every possible vertex position within the tile can thus be found by starting at the corner where only the vertex point is within the tile (i.e corner H in FIG. 8) and recursively filling out a table or an array corresponding to the tile (For along the edges, where the vertex corresponding to one of the previously computed areas in the recursive definition lies outside of the tile, this area can just be ignored in the calculation) These tables of operator values are preferably calculated for the eight corner positions for the tiles intersected by the octagon. As the octagon window slides over the image, each tile will eventually require each of the eight tables as it receives each of the eight vertices, but only one of the tables per tile is needed at any one time. Furthermore, the one set of sixteen tables for the sixteen tiles that might be intersected, is sufficient the calculation of a tiles-worth of octagon positions.

Referring again to FIG. 6, note that some tiles, such as 1, 4, 10 and 11, are partially covered by the octagon, but do not contain a vertex. These tiles can utilize the same table types as the tiles with octagon vertices by presuming that the vertex lies along an edge. For example, Tile 1 can use a table built the same way as the table for Tile 2 when the vertex lies along the right or top edge. Alternatively, Tile 1 could use a table built for the vertex pattern of Tile 5 by imagining the vertex lies along the bottom or left edge. As the octagon slides over the tiles, it can partially cover Tiles 6, 7, 13 and 16. These are handled in the same manner as Tiles 1, 4, 10 and 11 For some octagon positions, Tiles 6, 7, 10 and 11 can be completely covered. Any of the table approaches will give the value for a fully covered tile.

As in the case of a rectangular window, the value of the operator applied to the entire octagonal window can be calculated by using the operator to combine the values from the tiles. In this case, however, instead of four tiles there are potentially 16 tiles that contribute (14 of them contributing at any one time).

Figure 9:
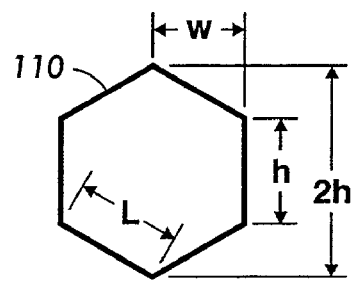
FIG. 9 is an illustration of a hexagonal window
Figure 10:
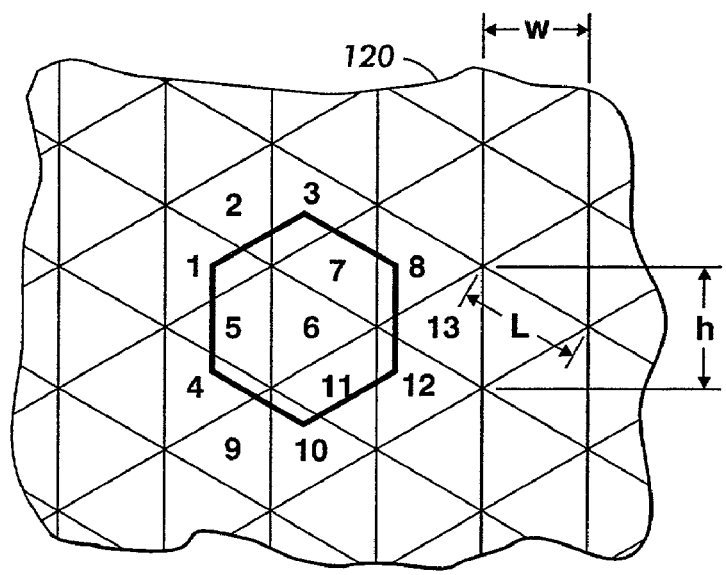
FIG. 10 is an illustration of a triangular grid to support a hexagonal window.

Referring now to FIG. 9, a similar approach can be used to support a hexagonal window 110 as shown. A grid of triangles is used to segment an image portion 120 rather than rectangles. An example is shown in FIG. 10 wherein the dimensions h, l and w are illustrated Referring now to FIG. 11, as in the above cases, there is at most one corner per tile and each tile is segmented into at most two regions There are six tables to calculate for each tile, corresponding to the six vertices (Tiles 1, 3, 4, 8, 10 and 12 in FIG. 10). The table values can be calculated recursively just as in the rectangular tile case.

Figure 11:
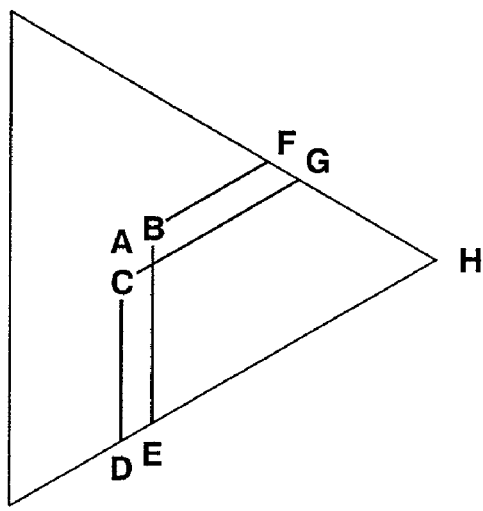
FIG. 11 is an illustration of a recursive computation of table values for a triangular tile.

As shown in FIG. 11, the value for region [A, F, H, D] can be found by using the operator Q to combine the value at A with the previously computed values for regions [C, F, H, E] and [B, G, H, D].

As in the octagon case, some of the tiles are divided into two regions by the hexagonal window but do not contain any vertices (Tiles 2, 5, 7, 9, 11, and 13 in FIG. 10). As before, the value for these tiles are given by the same tables as used in the case where a vertex is included by imagining that the vertex lies along one of the edges. And any table can supply the value for a tile that is completely covered (as is Tile 6 in FIG. 10).

The use of triangular tiles adds some complication to the determination of which tile contains a point and to which points are enclosed in a tile, but these are straight-forward geometric calculations that are well known to those skilled in the art They are often simplified by choosing the width w to equal the height h. Then, the slopes of the diagonal sides are 0.5 and −0.5.

An implementation of the present invention resides not only in a method to analyze an image portion as described above but also in an efficient method to determine the minimum intensity value in an annulus window, where the term annulus refers to a polygonal ring shape. This implementation provides an efficient method to calculate the exact minimum value of a large annulus window that moves over an image. The method first divides the annulus into rectangular components. The minimum of each component is calculated by the techniques according to the present invention or other methods such as the method as described in the '726 application. The minimum of the components is then determined as the minimum for the annulus.

Figure 12:
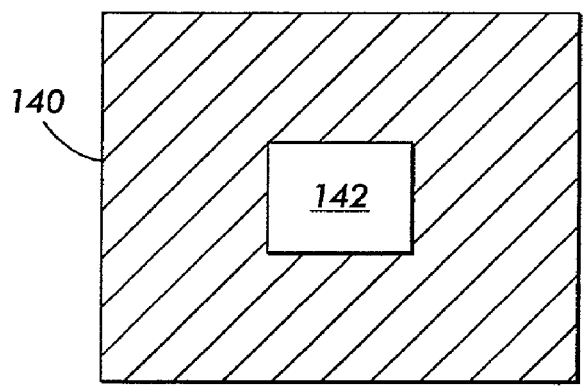
FIG. 12 is an illustration of an annulus.
Figure 13:
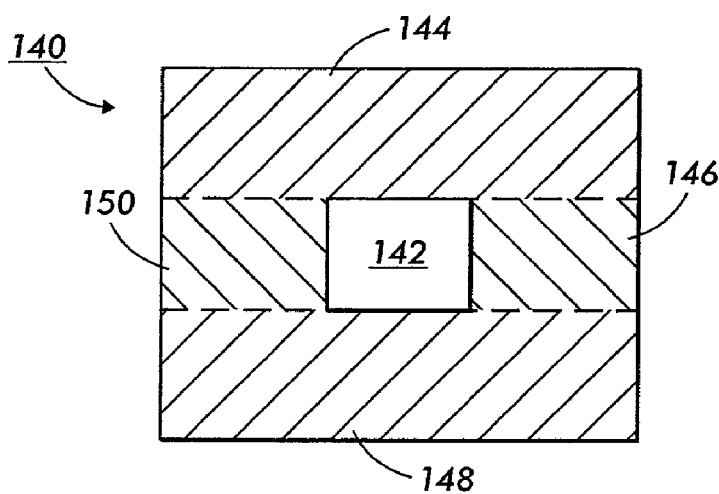
FIG. 13 is an illustration of a division of the annulus of FIG. 14

More particularly, methods of de-speckling of a digital image oftentime require that the minimum of the intensity values for an annular region 140 of the image, as shown in FIG. 12, be calculated Typically, this annular window is moved over the image such that it is centered at each pixel 142. Thus, an efficient method of determining the minimum value for each window position is needed. Referring now to FIG. 13, this can be accomplished by dividing the annulus 140 into rectangular regions 144, 146, 148 and 150 and accomplishing the operations as described herein on each of the divided regions. FIG. 13 demonstrates merely one possible division of the annulus. Those of skill in the art will understand that other divisions of the annulus may be used to achieve the same objectives. The operations are then conducted on the results from each region to obtain an overall result for the annulus.

This approach can be used to calculate associative operations (such as maximum, minimum, AND and OR operations) on complex shapes other than an annulus; the idea is to segment the complex shape into simple shapes such as rectangles, hexagons or octagons for which the operations can be efficiently calculated, and then combining the results from the segments That is, the method comprises steps of dividing a complex window into regions, computing a property for each region to obtain a partial result by conducting an associative operation, and determining the property for the complex window based on partial results of the regions by conducting the associative operation on the partial results.

If the method of the '726 application is used, the computation required is two comparisons of each pixel to find row running minimums, plus one compare for each pixel for the overall row minimum, then two compares for each pixel for the running column minimums and one compare for the overall minimum. This is a total of 6 compares for the minimum of the window. Since four rectangular windows are needed for an annulus this means that an average of 27 compares are needed to find the annulus minimum (24 for the rectangles and 3 to combine them). There is also the overhead of acquiring image data, stepping, and determining tile boundaries and saving results. Still the computation time is linear with the number of pixels and is fairly low Similarly, if the methods of the present invention are used, a single recursive calculation can be implemented to avoid the need to conduct the MINIMUM operation across rows then down columns. An arbitrary corner could be selected at which to begin each calculation. Thus, there would be no need to run the calculation multiple times for each region because the overall minimum in each region is independent of the starting point of the calculation.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, we hereby claim:

1. A method for computing properties of an image represented by pixel values arranged in an array, a method comprising steps of:
    scanning the array to determine the pixel values;
    segmenting the array into blocks of the pixel values;
    performing an associative operation on the pixel values of each block to determine properties of the each block;
    storing the properties of the each block in a table;
    providing a window defining a fixed size region of the image, the window having vertices and being configured such that a single vertex at most will be encompassed by any given block having portions within the fixed region;
    determining which portions of which blocks are within the fixed size region;
    selecting a property for each portion of each block within the fixed size region from the table based on the determining of which portions of which blocks are within the fixed size region and locations of the vertices of the window; and,
    performing the associative operation on the selected properties to determine the overall property of the region.

2. The method as set forth in claim 1 wherein performing the associative operation on the pixel values comprises determining maximums of the pixel values.

3. The method as set forth in claim 1 wherein performing the associative operation on the pixel values comprises determining minimums of the pixel values.

4. The method as set forth in claim 1 wherein performing the associative operation on the selected properties comprises performing an operation to determine a maximum value for the fixed size region.

5. The method as set forth in claim 1 wherein performing the associative operation on the selected properties comprises performing an operation to determine a minimum value for the fixed size region.

6. The method as set forth in claim 1 wherein providing a window defining a fixed size region of the image comprises providing a window having a rectangular shape.

7. The method as set forth in claim 1 wherein providing a window defining a fixed size region of the image comprises providing a window of octagonal shape.

8. The method as set forth in claim 1 wherein providing a window defining a fixed size region of the image comprises providing a window of hexagonal shape.

9. An apparatus for computing properties of an image represented by pixel values arranged in an array, the apparatus comprising:
    means for scanning the array to determine the pixel values;
    means for segmenting the array into blocks of the pixel values;
    means for performing an associative operation on the pixel values of each block to determine properties for the each block;
    means for storing the properties of the each block;
    means for defining a fixed size region of the image;
    means for determining which portions of which blocks are within the fixed size region;
    means for selecting a property for each portion of each block within the fixed size region from the storing means; and,
    means for performing the associative operation on the selected properties to determine an overall property for the fixed size region.

10. The apparatus set forth in claim 9 wherein the associative operation comprises determining a MINIMUM of the pixel values.

11. The apparatus set forth in claim 9 wherein the associative operation comprises determining a MAXIMUM of the pixel values.

12. The apparatus set forth in claim 9 wherein the properties of the block comprise minimums of the pixel values.

13. The apparatus set forth in claim 9 wherein the properties of the block comprise maximums of the pixel values.

14. The apparatus set forth in claim 9 wherein the defining means comprises a window having a rectangular shape.

15. The apparatus set forth in claim 9 wherein the defining means comprises a window of octagonal shape.

16. The apparatus set forth in claim 9 wherein the defining means comprises a window of hexagonal shape.

17. The apparatus set forth in claim 9 wherein the defining means comprises a window, the window having vertices and being configured such that a single vertex at most will be encompassed by any given block having portions within the fixed size region.

* * * * *